Nov. 8, 1966   R. MÜLLER ETAL   3,283,565
INDUSTRIAL CAPILLARY VISCOMETER
Filed May 20, 1963   2 Sheets-Sheet 1

INVENTORS:
RUDOLF MÜLLER, WERNER LESSNIG, STEPHAN PLATZ,
GÜNTHER KOEPKE
BY
Burgess, Dinklage + Sprung
ATTORNEYS

3,283,565
INDUSTRIAL CAPILLARY VISCOMETER

Rudolf Müller, Gruenwald, Munich, Werner Lessnig, Cologne-Flittard, and Stephan Platz and Günther Koepke, Leverkusen, Germany, assignors to Farbenfabriken Bayer Aktiengesellschaft, Leverkusen, Germany, a corporation of Germany
Filed May 20, 1963, Ser. No. 281,415
Claims priority, application Germany, May 26, 1962, F 36,911
4 Claims. (Cl. 73—55)

The invention relates to an industrial capillary viscometer for a fully automatic measurement of the viscosity of conductive liquids, particularly for photographic emulsions in the dark room, with electric probing of the volume to be measured, using a triple electrode.

The industrial viscometers with remote transmission of the value measured which have hitherto been known are too inaccurate for measuring the viscosity of photographic emulsions and do not fulfill the special requirements for an instrument used in the dark.

The high degree of accuracy required could hitherto be achieved only with capillary viscometers which have very long outflow times. For example, known capillary viscometers in which a constant volume of the liquid to be measured flows out through a capillary tube, the outflow time being a measure of the viscosity, have a relatively long measuring vessel (cylinder, ball) to which the capillary tube is attached at the bottom and to which a tube of small diameter is attached at the top. The exact measurement of the volume in these viscometers is effected by providing markings on the capillary below the measuring vessel and on the narrow tube above it at points at which the fluid flows more rapidly and undergoes a greater change in level for small changes in volume, the greater changes at these points being measurable with great accuracy. However, a capillary viscometer of this construction is not suitable for use as an industrial viscometer for measuring photographic emulsions, one reason being that it cannot readily be handled in the dark or cleaned.

One objection against the known rotation viscometers is that only small forces are transmitted by photographic emulsions, which have a relatively low viscosity, so that this measuring system would have to be able to measure small moments of rotation. Any slight contamination by solidified emulsion, particularly at the stuffing box of the measuring mechanism, gives rise to large errors. Moreover, the cleaning of this sensitive measuring mechanism gives rise to considerable difficulties.

An industrial capillary viscometer suitable for use in the dark for photographic emulsions must not only have a high degree of accuracy but must be relatively small, must take measurements fully automatically, the values measured must be transmitted to a distant point, and the instrument must be easy to clean and simple to handle. Industrial viscometers which meet all these requirements are not known.

In the capillary viscometer according to the invention, the viscosity, particularly of photographic emulsions, is measured by using a short substantially cylindrical measuring vessel with a capillary tube arranged below the vessel through which the emulsion flows out freely during the measuring time. The high degree of accuracy is achieved by inserting into the top of the measuring vessel a triple electrode arrangement with electrodes of different lengths, which probes the liquid level by making use of the conductivity of the liquid. The great advantage of having a free outflow from a capillary tube which is not immersed is that the same static pressure relationships always prevail when an emulsion flows from the capillary.

Another feature of the invention is an automatic electrical sequence control by which the measuring vessel is immersed into the emulsion, the emulsion is absorbed into the measuring vessel through the capillary, and after filling, the vessel is raised out of the emulsion to such an extent that a constant volume can flow freely out of the capillary which is now free. The time required for the outflow is measured by means of a synchronous motor to which a pick-up potentiometer is connected, and at the end of the measuring process, the value measured is connected to a writing mechanism known per se with a motor powered measuring mechanism whose writing mechanism, however, it put into operation only after the outflow time has been measured.

According to another embodiment, the synchronous motor may directly move the digit rolls of a mechanical rotary counter with a printing mechanism, the end positions of this counter then giving a direct measurement of the time required for the outflow. If, for example, the driven speed of the synchronous motor is set at one revolution per second, then the digits indicating the result correspond to seconds and $1/10$ seconds. A constructional example of the invention is shown diagrammatically in the drawing.

Figure 1:
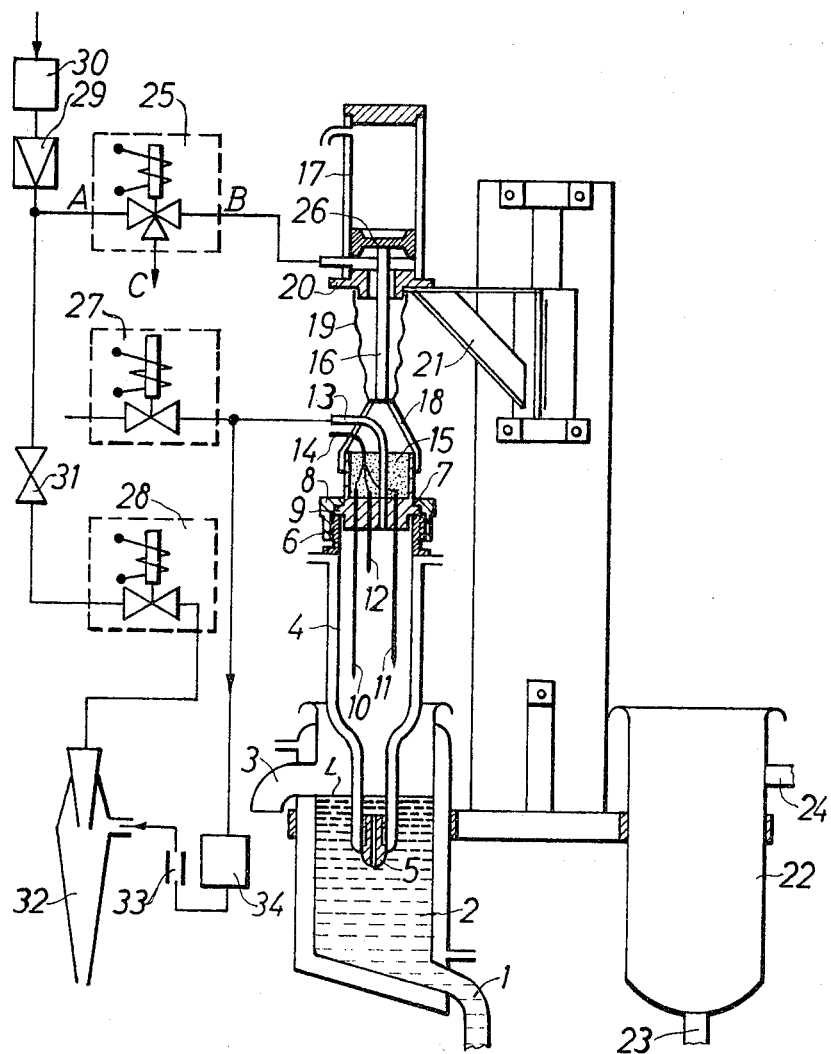
FIGURE 1 shows the capillary viscometer with an electropneumatic control arrangement.

The emulsion is supplied through an inlet 1 into a vessel 2 which has an inclined bottom and a double jacket and is heated to a slightly elevated temperature. The emulsion flows through this vessel and leaves it through an overflow duct 3. A cylindrical measuring vessel 4, which is also double walled and slightly heated, is supported above the vessel 2. In the initial position shown in FIGURE 1, the lower part of the vessel 4 into which a capillary 5 is screwed is completely immersed in the emulsion. The capillary 5 lies inside the temperature controlled zone of the vessel 4. The lower part of the vessel 4 is tapered both on the inside and on the outside in such a manner that the transition from the larger to the smaller diameters is effected over a large radius, so that there will be no sharp corners or angles where emulsion could be deposited. An external thread 6 is cut into the top end of the vessel 4. The vessel 4 is closed at the top by an electrode holder 7 which is screwed on to the vessel 4 by means of a cap nut 8 which fits over the external thread 6. A seal 9 is provided to ensure a perfect air-tight closure. A triple electrode is inserted tightly in the electrode holder 7. This triple electrode consists of three electrodes 10, 11 and 12 of different lengths, which are staggered in arrangement. The electrodes 11 and 12 taper to a point. The three electrodes 10, 11 and 12, the measuring vessel 4, the capillary 5 and the throughflow vessel 2 are made of stainless steel and polished. The electrode holder 7 is provided with a bore into which the suction tube 13 fits, and the undersurface of the electrode holder is treated with a varnish so that it cannot be wetted with water of condensation to render it conductive. It consists of an electrically non-conductive material (PVC or Teflon) and it is bored at the top to form an open tube. The three electrodes 10, 11 and 12 which are connected to a cable 14 extend into this tube. The whole of this tube is filled with a casting resin 15 which firmly encloses the connecting cable 14 and the parts where this cable is soldered to the electrodes, and seals them off from the outside. The electrode holder 7 is rigidly connected to the piston rod 16 of a cylinder 17, which operates by compressed air, by means of a bell-shaped conical intermediate piece 18. The piston rod 16 is sealed from the outside by means of the bellows 19. The flange 20 of the cylinder 17 is rigidly connected with a manually operated lifting and swivelling device 21 which enables the whole arrangement to be lifted or swung over a second throughflow vessel 22. Hot water flows through this vessel 22, entering at the inlet 23 and leaving at the outlet 24. The liquid level of this vessel is slightly higher than that of the vessel 2 owing to the fact that its outlet 24 is slightly higher.

The viscosity of the emulsion is measured in the arrangement shown. After swinging the arrangement over the vessel 22, a control measurement is carried out by determining the value for water. At the same time, the whole measuring apparatus including the capillary is automatically rinsed, and any residues of emulsion present are removed.

An electric sequence control, which is not shown in detail, operates the system as follows:

(A) Immersion of the measuring vessel in the emulsion.

With the magnetic valve 25 closed in the direction A–B and open in the direction B–C, the measuring vessel 4, which is rigidly connected with the piston 26 and the piston rod 16 drops under its own weight into its lower end position. The whole length of the capillary 5 is immersed in the vessel 2 which is filled with emulsion. When the magnetic valve 27 is open and connected with the suction tube 13, the emulsion rises through the capillary 5 into the measuring vessel 4 until the emulsion in the vessel 2 is at the level indicated by the line L which corresponds to the bottom of the overflow duct 3 and which represents the maximum liquid level attainable in the vessel 2 by reason of the overflow duct 3.

(B) Absorption of the emulsion into the measuring vessel by suction.

With the magnetic valve 27 closed and the magnetic valve 28 open, the compressed air, which is reduced by the pressure reducing means 29 and purified by a filter 30, is conveyed to a jet pump 32 through an adjustable needle valve 31. The input end of the jet pump 32 is connected through a capillary 33 and a buffer volume 34 with the suction tube 13 of the measuring vessel 4. The emulsion rises through the capillary 5 into the measuring vessel 4 in response to the vacuum which is slowly building up in the vessel 4. The capillary 33 and the buffer volume 34 ensure that the vacuum in the measuring vessel 4 will not build up suddenly but slowly. A sudden increase of vacuum in the measuring vessel 4 would cause the emulsion to flow too rapidly through the capillary at the beginning of suction, so that it would be impossible to avoid inclusions of air and hence production of foam. As the fluid is sucked in, first the electrode 10, then the electrode 11 and later the electrode 12 are immersed, so that a conductive connection is established between the electrodes 10 and 11 and between 10 and 12, these connections providing an electric preparation of the automatic time measurement which will take place subsequently. Hence, when the liquid has risen within the vessel 4 up to a predetermined lower level established by the electrode 11, an electrically conductive path will be established through the liquid between the electrodes 10 and 11. Similarly, when the liquid rises further up to a predetermined upper level set by the electrode 12, another electrical conduction path will be established between the electrodes 10 and 12. Thus, when the liquid flows out of the vessel 4 through the capillary member 5, the conduction path between electrodes 10 and 12 will be broken first, and then when a quantity of liquid corresponding to the difference between the levels set by the electrodes 11 and 12 has been discharged from the vessel 4, the conduction path between the electrodes 10 and 11 will be broken. The voltage applied to the electrodes must be of such a value that no sparks can occur when the electrodes are in the process of being immersed, and no electrochemical decomposition of the emulsion can occur when the electrodes have been immersed. Small alternating voltages with a frequency of 50 c./s. or more have been found to be satisfactory, but means for limiting the current must ensure that the maximum permissible current will at no time be exceeded.

(C) Ending the suction process.
(D) Lifting the measuring vessel out of the emulsion.
(E) Free outflow of a constant volume of emulsion through the measuring capillaries.
(F) Measuring of the outflow time.

When the electrode 12 is immersed in the emulsion, the magnetic valve 28 is closed by way of an electric delay switch and at the same time the magnetic valve 27 is opened and the magnetic valve 25 is closed in the direction B–C and opened in the direction A–B. Due to the delayed switching off of the magnetic valve 28, the suction process is also switched off after some delay, which ensures that the lower part of the electrode 12 will be fully immersed. Compressed air is delivered to the lifting cylinder 17 in the direction A–B through the pressure reducer 29, the filter 30 and the magnetic valve 25. The piston 26 of the cylinder 17 moves into the upper end position and in the process it lifts the measuring vessel 4 so far out of the emulsion that the capillary 5 is above the level of the emulsion in the vessel 2.

The rapid ventilation of the measuring vessel 4 through the suction tube 13 and the open magnetic valve 27 causes the emulsion to begin to flow freely out through the capillary 5. If the outflow is not free, the outflow time is affected by inconstant emulsion levels in the vessel 2 and by uncontrollable flow in the vessel 2. A time measuring device, not shown here, is switched on when the emulsion leaves the electrode 12 and is switched off when the emulsion leaves the electrode 11 so that the time required for the volume situated between the electrode tips of the electrodes 11 and 12 to flow out is measured. It is important to begin and end the time measurement when the identically shaped electrodes leave the emulsion as this avoids errors in the volumetric measurement which could occur due to different adhesion of the emulsion to the electrodes. Furthermore, the fact that the electrodes 11 and 12 taper to a point ensures that the emulsion will tear off sharply when it flows out.

When the emulsion leaves the electrode 11, the magnetic valve 25 is closed in the direction A–B and opened in the direction B–C. The piston 20 of the lifting cylinder 17 again moves to its lower end position, and the capillary 5 is again immersed in the emulsion as shown in FIGURE 1. The fact that the measuring vessel 4 is immediately immersed again in the emulsion in the vessel 2, i.e. before it is completely empty, ensures that the measuring capillary 5 always remains filled with emulsion, so that no dry films of emulsion will form in the capillary 5.

Figure 2:
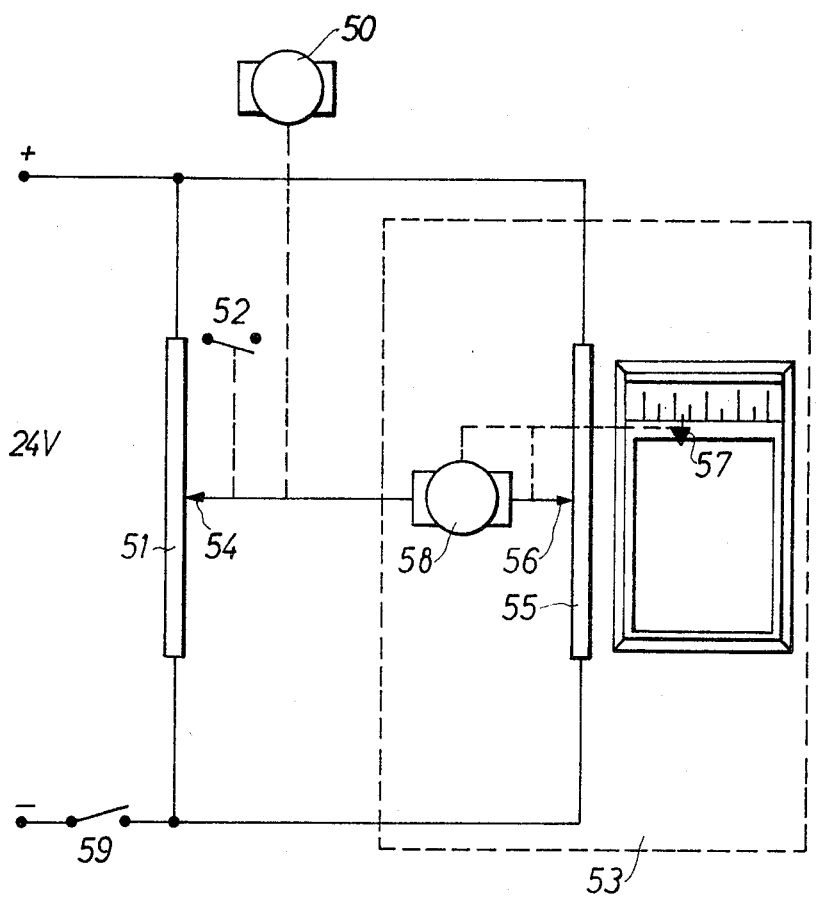
FIGURE 2 shows the apparatus for measuring the outflow time.

The actual measurement of the outflow time may be carried out, for example, as shown in FIGURE 2 with a synchronous motor 50 to which is connected a pick-up potentiometer 51 which is subjected to a potential from the moment that the upper electrode 12 becomes free to the moment when the lower electrode 11 becomes free. The measurement of the outflow time and hence of the viscosity is given by the angular displacement of the potentiometer 51. Before the measurement of the outflow time begins, the motor 50 adjusts the potentiometer 51, which can be turned right round, to a definite starting position and closes the electric contact 52. At the end of the measuring process, the position of the sliding contact 54 of the potentiometer 51 is switched to a line writer 53, which has no directive force, in a manner known per se. The potentiometer 51 constitutes one branch of a Wheatstone bridge, the second branch being formed by the potentiometer 55. The sliding contact 56 of the potentiometer 55 is directly connected by mechanical means with the writing system 57 and a measuring motor 58. The motor 58, which has a low starting voltage, lies in the diagonal branch of the bridge. At the end of the time measurement, i.e. when the emulsion leaves the electrode 11, the contact 59 is closed by a sequence-switch through a time delay member. It connects the measuring bridge to direct voltage for the time that the time delay member is switched on. If there is now a potential difference between the sliding contacts 54 and 56, the motor 58 will be displaced until the position of the contact 56, i.e. until the potential difference has become equal to the starting voltage of the motor 58. The time value or viscosity value is transmitted as an analogous value to the writer 53 due to the mechanical coupling of the sliding contact 56 and the writing system 57. An additional optical indication representing an analogous value may also be controlled from the pick-up potentiometer 51. When the time constant of the time delay member has expired and hence when the measured value has been transferred, the switch 59 is opened and the potentiometer 51 is turned by the synchronous motor 50 to its starting position up to the electric contact 52. The driven speed of the synchronous motor 50 determines the accuracy of measurement, but it may be freely selected according to the operating requirements. (The range of measurement may then be determined by the measuring capillary 5). If, for example, the driven speed of the synchronous motor 50 is so chosen that the potentiometer 51 is rotated once in 60 seconds, then time (outflow times) can be measured up to 60 seconds. To cover the whole sequence of operations of a viscometer, about 90 seconds are then required, that is to say, a new value can be indicated every 90 seconds. All the stages of operation of the capillary viscometer have then been run through, and the operation can then begin again from the beginning with the absorption of the emulsion.

We claim:

1. An apparatus for measuring the viscosity of electrically conductive liquids, which comprises an evacuable sampling vessel for receiving a quantity of electrically conductive liquid from an underlying source thereof, said sampling vessel being disposed for movement relative to such liquid source along a vertical path and between an upper position and a lower position thereon, a capillary member supported by said sampling vessel for movement therewith and disposed therethrough for extension into said liquid source when the vessel is in said lower position to accommodate the introduction of a predetermined sample quantity of the liquid into said vessel when same is evacuated to a reduced pressure, and to permit the efflux of said liquid sample from the vessel under the influence of gravity when said vessel is in said upper position and relieved of said evacuation, three electrodes extending downwardly into said vessel from the upper portion thereof and disposed for electrically conductive contact with the liquid therein to sense the level of such liquid and changes in level thereof, the first of said electrodes extending to a lowermost position in said vessel, the second of said electrodes extending to a lower position in said vessel but above that of the first electrode and corresponding to a predetermined lower liquid level in the vessel, and the third of said electrodes extending to a position in said vessel above those of the first and second electrodes and corresponding to a predetermined upper liquid level in the vessel, said first and third electrodes being disposed to establish a first electrically conductive path therebetween through the liquid in the vessel when said liquid is at a level at least equal to said predetermined upper liquid level, and said first and second electrodes being disposed to establish a second electrically conductive path therebetween through the liquid in the vessel when said liquid is at a level at least equal to said predetermined lower liquid level, time measuring means operatively connected to each of said three electrodes for measuring the time interval between the breaking of said first electrically conductive path and the breaking of said second electrically conductive path, motor means operatively connected to said sampling vessel for selectively moving same relative to the liquid source and into said upper and lower positions, said motor means being operatively connected to said first and third electrodes and responsive to the establishment of said first electrically conductive path therebetween to raise said vessel from its lower position to its upper position when the liquid in said vessel rises to at least said predetermined upper liquid level, and valve means disposed for communication with said vessel and for communication with a vacuum source for selectively evacuating said vessel when same is in its lower position to draw liquid from said liquid source into said vessel, and for venting said vessel to relieve the evacuation thereof when said vessel is in its upper position to permit efflux of liquid therein through said capillary member under the influence of gravity, said valve means being operatively connected to said first and third electrodes and responsive to the existence of said first electrically conductive path therebetween to vent said vessel when same is raised by motor means, whereby the viscosity of the conductive liquid can be determined by moving the sampling vessel to its lower position by the motor means and operating said valve means to evacuate the vessel and thereby draw liquid from the source thereof into said vessel until the liquid level therein rises to said predetermined upper level and establishes said first conductive path whereupon in response thereto, the motor means raises said vessel to its upper position and the valve means vents said vessel to permit efflux of the liquid therefrom by gravity through the capillary member, thereby discharging a quantity of liquid corresponding to the difference between said predetermined upper and lower liquid levels during the time interval between the breaking of said first and second conductive paths in sequence, with said time interval as measured by the time measuring means corresponding to the viscosity of the liquid.

2. The apparatus according to claim 1 wherein said motor means is disposed to normally position the sampling vessel in its lower position to immerse the capillary member in the liquid source and thereby prevent the formation of dry films within said capillary member.

3. The apparatus according to claim 1 wherein said time measuring means includes a synchronous motor operatively connected to a potentiometer to drive the movable arm thereof from a reference position to a final position during said time interval between the breaking of said first and second conductive paths to indicate the viscosity of the liquid discharged from the vessel during said time interval by the final position of said potentiometer arm.

4. The apparatus according to claim 3 including recording means operatively connected to said potentiometer and responsive to the position of the movable arm thereof to record the viscosity of said liquid discharged during the measuring time interval as indicated by the final position of said arm.

References Cited by the Examiner
UNITED STATES PATENTS

| 1,973,297 | 9/1934 | Shearer | 73—55 |
| 2,202,197 | 5/1940 | Ewertz | 73—304 X |
| 2,233,297 | 2/1941 | Polin et al. | 73—304 |
| 3,074,266 | 1/1963 | Sadler et al. | 73—55 |
| 3,187,563 | 6/1965 | Tobias | 73—56 |

DAVID SCHONBERG, Primary Examiner.